Patented Dec. 27, 1932

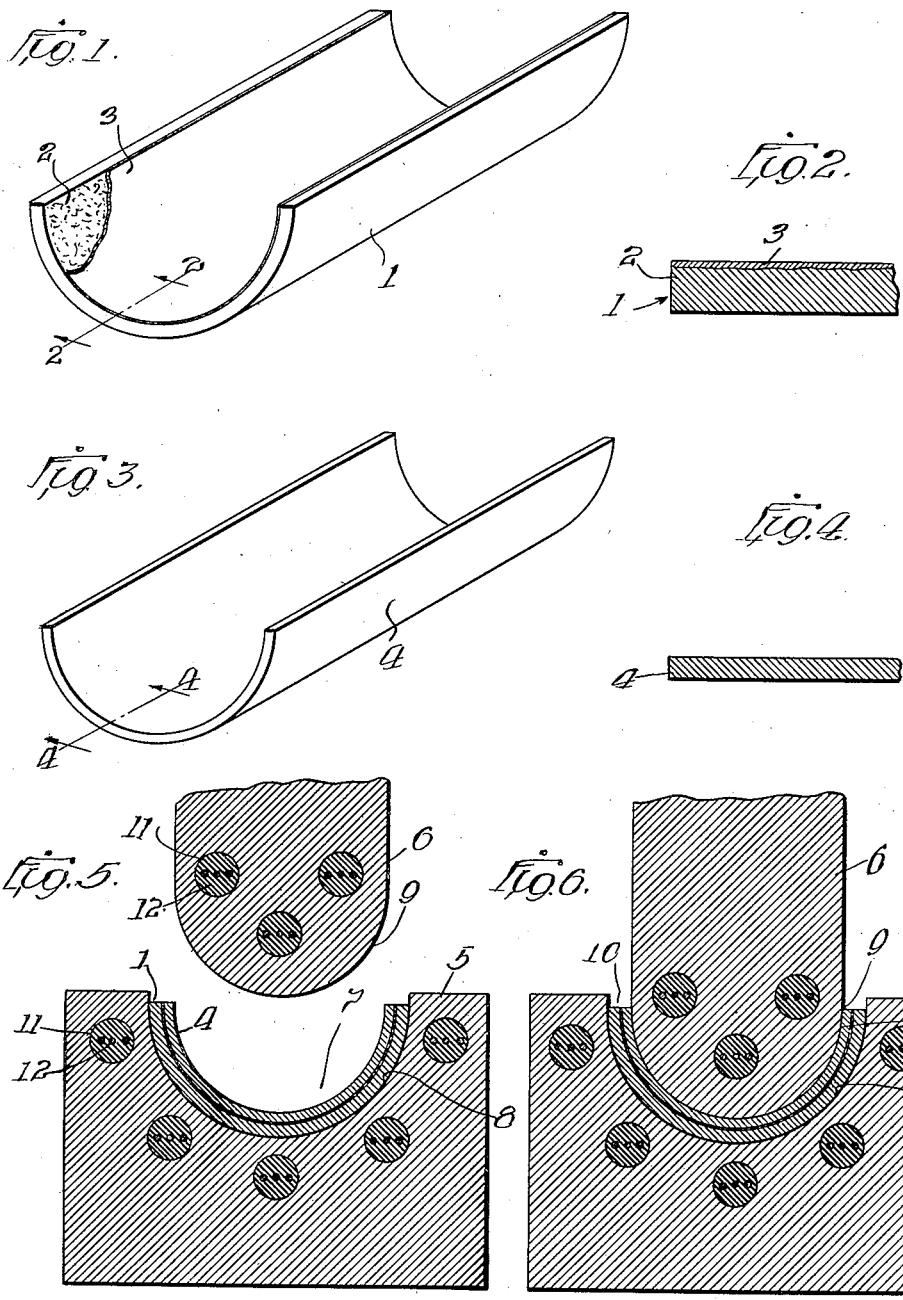

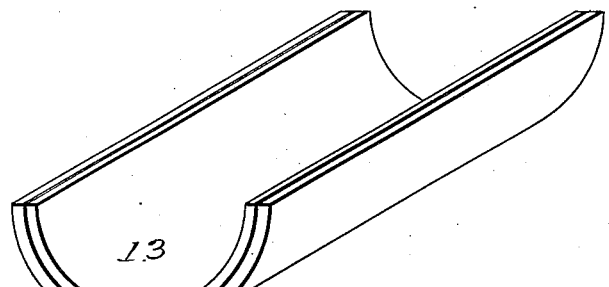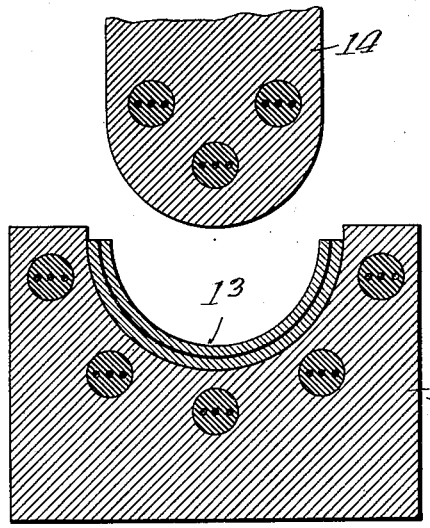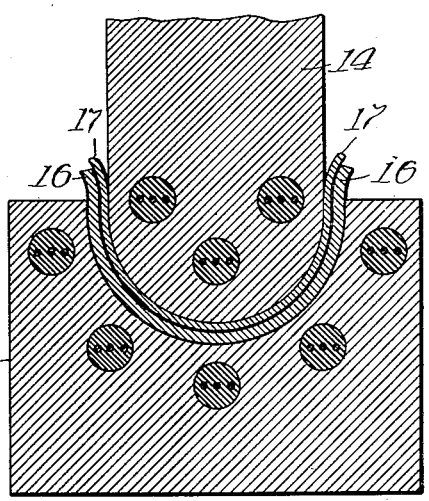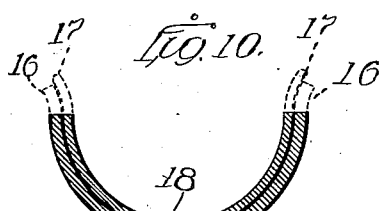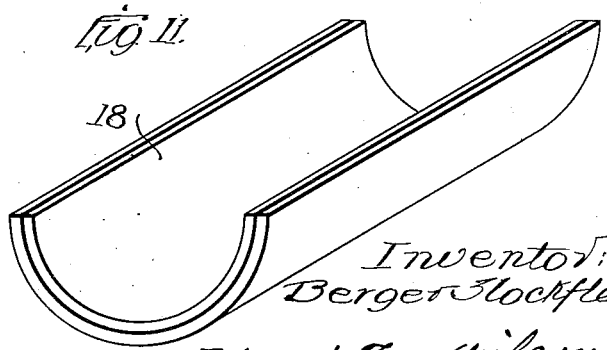

1,892,177

UNITED STATES PATENT OFFICE

BERGER STOCKFLETH, OF NILES, MICHIGAN, ASSIGNOR, BY MESNE ASSIGNMENTS, TO THE CLEVELAND GRAPHITE BRONZE COMPANY, OF CLEVELAND, OHIO, A CORPORATION OF OHIO

METHOD OF MAKING BEARING SLEEVES

Application filed March 1, 1930. Serial No. 432,507.

This invention relates to improvements in processes of manufacturing bi-metal bearing sleeves and has special reference to improved methods of making blanks for such sleeves, the blanks being substantially half cylindrical in shape and consisting of a harder metal back, such as steel, bronze or brass, etc., and a softer bearing metal lining, such as Babbitt metal.

Heretofore, so far as I am aware, the lining of Babbitt metal has been formed or cast in position on the back either in flat or semicylindrical shape.

This present invention involves the idea of forming the backing member roughly to shape and also forming the lining metal roughly to shape and then uniting these two, to form the blank, by pressure and heat.

In this process, the inside of the backing blank is first roughened to provide means for mechanically bonding the lining metal thereto and, preferably, at least the inner surface of the backing member is coated with a suitable bonding metal, such as tin.

Preferably, though not necessarily, the two roughly formed parts are bonded together in one set of dies and the sleeve is finished in a second set of dies.

The object of the invention is to simplify and cheapen the manufacture of such bearing sleeves, thus reducing the cost and increasing the output.

The lining member of bearing metal can be performed from a sheet of the metal or can be cast in the necessary half-cylindrical form. The idea is that the two parts are preformed roughly to the shape and dimensions of the completed sleeve but preferably somewhat thicker radially and after being arranged properly nested together, the sleeve is formed in rough blank form pressing the two parts together in suitable dies. The dies are preferably maintained relatively hot, though not hot enough to cause the bearing metal to change its internal structure but preferably hot enough to cause the bonding metal to melt and alloy with the bearing metal. The back member and, under some conditions, the bearing metal member are pre-heated to a desirable high temperature before they are nested together for submission to pressure in the blank forming dies.

After the rough blank sleeve is formed as noted, it is removed from the bonding dies and cooled to set the bonding metal. Then it is subjected to a relative heavy forming pressure to size and finish the sleeve, the dies preferably being heated but not as hot as the set of bonding dies.

The temperature of the finished dies is preferably slightly below the melting point of the bonding metal so that in this final operation, the bond will not be ruptured. In this final operation, both the back and the lining are thinned radially and elongated more or less circumferentially.

The invention will be best understood by reference to the following description and claims taken in conjunction with the accompanying drawings in which:—

Fig. 1 is a perspective view of a sleeve backing shell, a part of the tinning broken away to show the roughened inner surface of the shell;

Fig. 2 is a fragmentary section on the line 2—2 of Fig. 1;

Fig. 3 is a view similar to Fig. 1 of a preformed bearing metal lining;

Fig. 4 is a fragmentary section on the line 4—4 of Fig. 3;

Fig. 5 is a fragmentary vertical section of a forming press showing the nested parts of the sleeve in position to be pressed together for causing the lining to be bonded to the back;

Fig. 6 is a view similar to Fig. 5 but showing the completion of the bonding operation;

Fig. 7 is a perspective view of the rough blank consisting of the lining bonded to the back;

Fig. 8 is a view similar to Fig. 5 but showing the finishing dies;

Fig. 9 is a view similar to Fig. 6 and showing the completion of the sizing and finishing operation;

Fig. 10 is a sectional view of the finished sleeve showing the extruded parts in dotted lines; and Fig. 11 is a perspective view of a finished sleeve.

In said drawings 1 is a preformed backing shell for a bi-metal bearing sleeve. The shell is preferably roughened at least on its inner surface, as shown at 2, by shot blasting or some similar method and later at least the inner surface is coated with a suitable bonding metal such as tin, shown at 3.

While the roughening and tinning might be done before or after the back is formed into semi-cylindrical shape, I prefer to do this afterward so that the roughening will not be disturbed by the rough forming step.

In Fig. 3 I have shown in perspective a thin walled semi-cylindrical shell 4 made of a suitable bearing metal, such as babbitt, and of a size to freely nest in the backing shell 1.

After the two shells are thus formed, they are nested together as shown in Fig. 5, the bearing metal shell 4 inside of the backing shell 1 and they are then subjected to a pressure between the die parts 5 and 6 sufficient to force them into intimate and close contact.

The die part 5 is a die block provided with a die opening 7 which has a semi-cylindrical surface 8 substantially of the form and size of the outer surface of the rough backing 1. The die part 6 is a co-operating plunger having a lower end 9 of the shape and size to fit within the lining 4 and between the two die parts the assembled back and lining are pressed tightly together.

Preferably, the backing shell 1 is pre-heated before being placed in the dies usually being placed in the dies almost directly after having been dipped in a bath of molten tin for tinning the inner surface thereof.

Preferably, though not necessarily, the lining shell 4 is also pre-heated but not to such a degree as to destroy its internal structure.

The die parts 5 and 6 are maintained hot during the pressing operation as indicated diagrammatically by the electric heating elements 11 arranged in suitable openings 12 in the two die members, or by some other suitable means.

The dies are not hot enough to melt the babbitt but may be hot enough to melt the bonding metal, thus assisting in producing a perfect bond between the back and the lining.

After the two parts have been thus effectively bonded together, the rough or unfinished sleeve 13 thus produced is removed from the hot dies and cooled to set the bonding metal.

The next step in the operation is to finish and size the sleeve. This is accomplished similarly to the method disclosed in the co-pending application filed by me, February 4, 1929, Serial No. 337,934.

This improved method of completing the sleeve so far as it relates to the present invention is illustrated in Figs. 8 to 11, inclusive.

Co-operating finishing dies 14 and 15 are provided between which the rough bi-metal blank 13 is pressed. The pressure is applied substantially radially and is sufficient to compress and thin the sleeve radially and cause its enlargement in other directions. Usually, there is sufficient thickness provided so that in compressing the sleeve radially to the required radial thickness, the metal of the sleeve is extruded along the longitudinal edges, as shown at 16. In this finishing process, the sleeve is accurately sized and finished except as to the removal of the extruded edge portions 16 which is accomplished in any suitable manner. The idea is to produce accurate, half-cylindrical sleeves so that by using two thereof, a perfect cylindrical sleeve is produced for use in a bearing. It should be understood, of course, that the final forming and finishing pressure is very heavy and is sufficient and the action is such that the lining and the back are extruded together. The lining being softer than the back may be, and usually is, extruded slightly more than the back, as indicated at 17, but such extrusion of the lining is not sufficient to disturb the bond which is produced in the first step of the operation. As explained, the extruded portions 17 are removed leaving the finished half-cylindrical sleeve, as shown at 18, Fig. 11.

The described method of making bi-metal bearing sleeves is very simple and it lends itself to quantity production. The lining shells can either be formed up out of suitable sheets or cast originally in the half-cylindrical form, but in any event, the originally produced surface or skin of the Babbitt metal is preserved to form the inner wearing surface of the bearing sleeve.

In the process of pressing the two parts together and forming the finished sleeve, many desirable and advantageous functions and features are developed or preserved.

Chief among these is the compression or densification of the metals of the sleeve rendering them best suited to the purpose, in that they best carry away heat from the bearing and they best preserve their original form and size under severe use.

In addition, as explained, the surface or skin of the preformed lining shell is retained intact and it is well known that the certain internal structures which are of benefit in bearings do not penetrate very deeply into such articles.

As many modifications of the invention will readily suggest themselves to one skilled in the art, I do not limit or confine my invention to the specific disclosures herein made except within the scope of the appended claims.

I claim:

1. The herein described method of making a bearing sleeve, having a relatively hard metal back and a bearing metal lining, which consists in preforming the two parts roughly to their finished forms and dimensions, roughening the inner side of the back and coating it with a bonding metal such as tin, nesting the two parts together and applying heat and pressure to cause them to properly bond, cooling the roughly sized sleeve and subjecting it to radial pressure sufficient to compress the sleeve radially and elongate the metals of the sleeve substantially equally in a direction substantially parallel with the cooperating die surfaces.

2. The herein described method of making a bearing sleeve, having a relatively hard metal back and a bearing metal lining, which consists in preforming the two parts roughly to their finished forms and dimensions, roughening the inner side of the back and coating it with a bonding metal such as tin, heating at least the backing member to approximately the melting point of the bonding metal, nesting the parts together and applying pressure radially sufficient to cause the parts to be bonded together, cooling the roughly sized sleeve and subjecting it to radial pressure sufficient to compress the sleeve radially and elongate it in a direction substantially parallel with the cooperating die surfaces, the original inner surface of the lining being preserved as the finished inner surface of the finished sleeve.

3. The herein described method of making a bearing sleeve, having a relatively hard metal back and a bearing metal lining, which consists in preforming the two parts roughly to their finished forms and dimensions, roughening the inner side of the back and coating it with a bonding metal such as tin, heating the two parts to approximately the melting point of the bonding metal, nesting the parts together and applying pressure radially sufficient to cause the parts to be bonded together, cooling the roughly sized sleeve and subjecting it to radial pressure sufficient to compress the sleeve radially and elongate it circumferentially.

4. The herein described method of making a bearing sleeve, having a relatively hard metal back and a bearing metal lining, which consists in preforming the back roughly to the finished form and dimensions, the back being roughened and coated with a bonding metal on its inner surface, preforming the lining roughly to its finished form and dimensions, preheating at least the backing part substantially to the melting point of the bonding metal, nesting the two parts and by the application of radial pressure causing them to be bonded together, cooling the roughly sized sleeve and subjecting it to radial pressure sufficient to compress the sleeve radially and elongate it in a direction substantially parallel to the die surfaces.

5. The herein described method of making a bearing sleeve, having a relatively hard metal back and a bearing metal lining, which consists in preforming the two parts roughly to their finished forms and dimensions, roughening the inner side of the back and coating it with a bonding metal such as tin, nesting the two parts together and applying heat and pressure to cause them to properly bond, cooling the roughly sized sleeve and subjecting it to radial pressure sufficient to compress the sleeve radially and elongate it circumferentially between dies heated to a point slightly below the melting point of the bonding metal.

6. The herein described method of making a bearing sleeve, having a relatively hard metal back and a bearing metal lining, which consists in preforming the two parts roughly to their finished forms and dimensions, coating at least the inner surface of the back with a suitable bonding metal such as tin, nesting the two parts together and applying heat and pressure to cause them to properly bond, cooling the rough blank sufficient to set the bonding metal and subjecting the rough blank in a heated condition to pressure in suitable dies, the dies heated to a temperature slightly below the melting point of the bonding metal, to finish and size the sleeve.

In witness that I claim the foregoing as my invention, I affix my signature this 26th day of Feb., 1930.

BERGER STOCKFLETH.